United States Patent [19]
Chapman

[11] 3,919,342
[45] Nov. 11, 1975

[54] PROPANE RECOVERY IN HF ALKYLATION UTILIZING EXTRACTION OR TWO-PHASE CONDENSATION FOR REMOVAL OF ORGANIC FLUORIDE

[75] Inventor: Charles C. Chapman, Bartlesville, Okla.

[73] Assignee: Phillips Petroleum Company, Bartlesville, Okla.

[22] Filed: Oct. 18, 1973

[21] Appl. No.: 407,771

Related U.S. Application Data

[63] Continuation-in-part of Ser. Nos. 169,631, Aug. 6, 1971, abandoned, and Ser. No. 177,609, Sept. 3, 1971, abandoned, and Ser. No. 357,663, May 7, 1973, abandoned.

[52] U.S. Cl. .................... 260/683.42; 260/683.48
[51] Int. Cl. ............................................ C07c 3/52
[58] Field of Search...... 260/683.48, 683.42, 683.41

[56] References Cited
UNITED STATES PATENTS

| | | | |
|---|---|---|---|
| 3,190,935 | 6/1965 | Hutson, Jr. | 260/683.42 |
| 3,204,010 | 8/1965 | Van Pool | 260/683.48 |
| 3,204,011 | 8/1965 | Hettick et al. | 260/683.48 |
| 3,751,517 | 8/1973 | Hutson, Jr. et al. | 260/683.48 |
| 3,767,727 | 10/1973 | Chapman | 260/683.48 |

FOREIGN PATENTS OR APPLICATIONS

| | | | |
|---|---|---|---|
| 670,135 | 9/1963 | Canada | 260/683.42 |

Primary Examiner—Delbert E. Gantz
Assistant Examiner—G. J. Crasanakis

[57] ABSTRACT

Two substantially immiscible fluids which are but sparingly soluble in sense that two phases of them forms when real amount of them as liquids are present together, in vapor forms, in each of which a third fluid is soluble, are condensed and before generation, and separation of phases formed is effected are intimately intermingled as condensing or condensed so as to more nearly reach equilibrim concentration of the third fluid in each of said two fluids upon liquid phases formation said third fluid normally, upon phase formation and separation, not reaching in any acceptable time its equilibrium concentration in each of said two immiscible fluids. In alkylation of hydrocarbons, e.g., in an alkylation of an isoparaffin with an olefin, in which an overhead hydrocarbon stream from a fractionator containing hydrocarbon, alkyl fluoride, and hydrofluoric acid is condensed forming a hydrocarbon phase and an acid phase, and the phases separated, the overhead, upon being condensed at least in part, is subjected to intimate admixing prior to forming two separate liquid phases and separating them each from the other.

In one embodiment, the condensing fluids are vigorously admixed prior to permitting phases formation. In another, the phases already substantially formed are intimately admixed prior to separation of them, thus to ensure, upon separation of the phases, more nearly the equilibrium concentration of said third fluid in each of said two fluids. In a further embodiment, the formed, separated phases are intimately intermingled, phases again allowed to form and then again separated.

11 Claims, 5 Drawing Figures

PROPANE RECOVERY IN HF ALKYLATION UTILIZING EXTRACTION OR TWO-PHASE CONDENSATION FOR REMOVAL OF ORGANIC FLUORIDE

This application is a continuation-in-part of the following applications for patent, Ser. No. 169,631, filed Aug. 6, 1971 and now abandoned; Ser. No. 177,609, filed Sept. 3, 1971 and now abandoned; and Ser. No. 357,663 filed May 7, 1973 and now abandoned.

This invention relates to separation of fluids. More particularly, it relates to the attaining of equilibrium concentrations of a third fluid in each of two fluids, to be separated as by phase separation, prior to said phase separation. Still more particularly, the invention relates to the more rapid recovery of a component from one forming or formed phase into another forming or formed phase, following distillation and condensation of a vapor stream containing two substances, normally liquid under condensation conditions and said component. In one of its applications the invention relates to the separation of a hydrocarbon and acid as obtained upon condensing an overhead fraction containing the same in fractionation of alkylation effluent, e.g., effluent obtained upon the alkylation of an isoparaffin with an olefin in the production of a motor fuel or ingredient thereof. Further, it relates to the alkylation of hydrocarbons in the presence of HF catalyst in the production of an alkylate as in the alkylation of an isoparaffin with an olefin, e.g., the alkylation of at least one isoparaffin having 4 to 6 carbon atoms to the molecule with at least one olefin haveing 2 to 6 carbon atoms to the molecule, for example the alkylation of an isoparaffin using ethylene either as olefin to alkylate the isoparaffin and/or to modify the HF catalyst.

In one of its concepts the invention provides a method for separating two immiscible liquids and for increasing the amount in one of said liquids of a third component which, though present in the system when the two liquids and the third component are present in the presence of each other, all as vapors, and are condensed by cooling of a vaporous stream containing said liquids and said third component, will be found in one of the just condensed phases to an extent greater than after settling the two phases each in the presence of the other for a long time, and in an increased amount in the remaining phase after such settling, which comprises passing said stream into a cooling zone, therein extracting heat from said stream to condense an appreciable portion of said stream to form an appreciable amount of the liquids of each of said liquids and said third component contained in at least one of said liquids, intimately mixing or agitating the now condensing or condensed liquids, then allowing the condensed, now intermingled liquids to form phases, and separating said phases, and recovering said liquids each of which now contains more nearly the equilibrium concentration of said third component as it would be distributed in said liquids had the condensed vaporous stream been allowed to stand for an indefinite time sufficient to allow migration of said third component to establish said equilibrium concentration of it in each of said liquids.

In another of its concepts the invention provides an apparatus essentially comprising admixing or recontacting means functioning to intimately contact portions of the condensing liquids each with the other prior to allowing the now recontacted liquids to form separate phases, the apparatus in one embodiment comprising essentially a condenser, an agitator in the line of flow of the liquids and at least a portion of a container in which the agitated liquids can be retained quiescent for a time sufficient to form separate phases, e.g., there is provided between a condenser and an accumulator or in the alternative in a portion of an accumulator an agitating means. If the agitating means is within a portion of the accumulator or extends throughout the entire accumulator, then in that event another portion of the accumulator will be one in which the liquids can be quiescent to form separate phases or there will be a further vessel in which the separate phases can be allowed to form.

In another of its concepts the invention provides a method for separating two immiscible liquids and for increasing the amount in one of said liquids of a third component which, though present in the system when the two liquids and the third component are present in the presence of each other, all as vapors, and are condensed by cooling of a vaporous stream containing said liquids and said third component, will be found in one of the just condensed phases to an extent greater than after settling the two phases each in the presence of the other for a long time, and in an increased amount in the remaining phase after such settling, which comprises:

1. passing said stream into a cooling zone, therein extracting heat from said stream to condense an appreciable portion of said stream to form an appreciable amount of the liquids of each of said liquids and said third component contained in at least one of said liquids, 2. allowing the condensed, now intermingled liquids to form phases, 3. separating said phases, recovering third component from one of said liquids containing the same by 4. recontacting the separated liquids under conditions of intimate mixing, then 5. allowing phases once again to form and now separating and 6. recovering said liquids each of which now contains more nearly the equilibrium concentration of said third component as it would be distributed in said liqu'ds had the condensed vaporous stream been allowed to stand for an indefinte time sufficient to allow migration of said third component to establish said equilibrium concentration of it in each of said liquids.

In another concept still, the invention provides an alkylation of an isoparaffin, e.g., isobutane and/or isopentane with at least one olefin, for example, propylene, butylenes, amylenes, hexenes, or with ethylene in addition to at least one of these heavier olefins, etc., in the presence of hydrogen fluoride or hydrofluoric acid as catalyst wherein alkylation effluent obtained from the alkylation reaction zone is settled to form a hydrocarbon phase and an acid phase, hydrocarbon phase is subject to fractionation, resulting in a fractionation overhead comprising as may be the case light gases, propane, HF and organic fluoride, the overhead is condensed to form a hydrocarbon phase and an acid phase, a portion of the hydrocarbon phase is used as reflux for the fractionation, another portion of the hydrocarbon phase is recontacted with the acid phase removed from the hydrocarbon phase, to remove or extract organic fluoride from the hydrocarbon phase into the acid phase, the thus treated hydrocarbon phase is subjected to removal of HF therefrom as by a stripping operation, the recovered HF is returned to said acid phase, thus yielding a relatively high purity HF acid phase for said removal of organic fluoride, and the hydrocarbon from which HF has been recovered is yielded from the operation. In another of its concepts, the invention provides a process for an alkylation as described in which that portion of propane and/or butane which is to be yielded from the process is used as motive force for an eductor into which the high purity HF is educted whereupon the combined acid and hydrocarbon phases are given time wherein the acid will take from the hydrocarbon phase the organic fluoride. In still a further concept of the invention, the combined acid and hydrocarbon phases are passed to a further eductor into which there is educted thereby a heated HF phase which in turn is generated by heating the effluent from said second eductor, removing hydrocarbon from the heated mixture and educting resulting HF phase into said second eductor, the hydrocarbon removed from the heated HF being treated as by stripping to recover HF therefrom for yielding the hydrocarbon from the operation. In a further concept still, the invention provides a process wherein a loop reaction zone in combination with a settling zone is used for recontacting the relatively high purity HF and the hydrocarbon, the hydrocarbon being separated from the settling portion of the loop-settling section combination.

It has occurred to me that prior to separation of the phases as described there should be an intimate admixing of the liquids as these are condensing or have condensed following which phase separation when made will permit recovering the separated liquids each of which will now contain more nearly the equilibrium concentration of the third component as indeed it would be distributed in said liquids had the condensed vaporous stream been allowed to stand for an indefinite time which would be sufficient to allow migration of said third component to establish said equilibrium concentration of it in each of said liquids. Thus, it has occurred to me to provide for admixing with admixing means the condensing liquids as these are condensing or shortly after they have condensed and when two phases have formed and have been separated to recontact the phases, following which there can be a further formation and separation of phases to recover phases containing the more nearly equilibrium concentrations herein discussed.

I have discovered that although phase separation as in a settler or accumulator to which a stream from a distillation has been condensed, e.g., as herein described, is fed to form phases, and from which the formed phases are removed, it is possible upon recontact of the phases after their initial formation to increase the proportion of a component in one of the phases at the expense of said component in the other of said phases. It appears that upon cooling and/or chilling a vaporous stream as herein described the times and/or rates of condensation of the several ingredients of such a stream can be such that unless the formed phases are allowed to stand unacceptable lengths of time one of them can be carrying more than its equilibrium and the other less than its equilibrium concentration of a third component, as herein defined. Thus I have discovered that the HF phase, herein described, formed upon condensing a vaporous stream after actual separation from the hydrocarbon phase can contain substantially less organic fluoride than it is capable of holding in the presence of the hydrocarbon phase and would hold after an unacceptable length of time in the presence thereof.

Further it has occurred to me that if the overhead from the fractionation of the alkylate effluent is sufficiently cooled and/or chilled there can be produced an HF phase which relative to the hydrocarbon phase from which it has been separated can be termed a high purity HF. Further, it has occurred to me that the hydrocarbon remaining upon removal therefrom of the said high purity HF can and in some instances should be gently heated to remove therefrom ethane, with minimum loss of HF, by cooling and dephlegmating vapors thus obtained, and further that residual liquid thus obtained containing propane and ethyl fluoride can be treated with said high purity HF to remove ethyl fluoride therefrom, thus yielding propane. Further still, it has occurred to me that alkyl fluoride, for example, ethyl fluoride and hexyl fluoride which are obtained in an overall operation can be suitably each of them processed so that according to my concepts as they are interrelated a final alkylate product can be obtained containing only an insignificant amount of alkyl fluoride.

Thus I have found that a dynamic system to which this invention relates, though it does not permit in and of itself the recovery of alkyl fluoride upon simple condensation, will, provided there is an intermingling of phases upon condensation, result in increased removal of fluorides from the hydrocarbon phase without need to store the phases in the presence of each other for times which significantly exceed those normally spent by said phases in such dynamic or continuous operation.

It is an object of this invention to provide for the separation of liquids. It is another object of this invention to provide for the condensing of at least two fluids together with a third which is to an extent soluble in each of said two fluids following which upon phase separation there can be obtained at least two liquid phases which upon separation will contain in each of them more nearly the equilibrium concentration of said third fluid or component as it would be distributed in said liquids had the condensed vaporous stream been allowed to stand for an indefinite time sufficient to allow migration of said third component to establish said equilibrium concentration of it in each of said liquids. It is a further object of this invention to provide an improved alkylation process in which an isoparaffin is alkylated with an olefin and in which alkyl fluoride is formed. It is a still further object of this invention to provide such an alkylation process in which alkyl fluoride obtained in an overhead stream which upon condensing forms a hydrocarbon phase and an acid phase will be more completely removed from the hydrocarbon phase into the acid phase. A further object of the invention is to provide for the alkylation of an isoparaffin, for example, isobutane and/or isopentane with at least one olefin, for example, an olefin selected from propylene, butylenes, amylenes, and hexenes. It is a still further object of this invention to provide a process for the alkylation of at least one isoparaffin with ethylene and at least one higher olefin and to economically recover from streams to be yielded organic fluoride, including ethyl fluoride for use in the operation to increase alkylate yield. It is a further object still to provide an alkylation as herein described wherein only the streams in quantity to be yielded are treated to recover organic or alkyl fluoride. A still further object of the invention is to shift the locus at which organic fluoride is recovered.

Other aspects, concepts, objects and the several advantages of this invention are apparent from a study of this disclosure, the drawings and the appended claims.

According to the present invention at least two fluids which are being condensed to form substantially immiscible liquids in the presence of a third component or fluid, which is soluble in each of said two fluids, are admixed upon formation of the liquids prior to settling to form separate phases and the phases are separated each from the other, as described herein.

Thus, according to the present invention, a vaporous stream containing at least two ingredients, which will become normally immiscible liquids upon subjecting said stream to conditions of condensation, also containing a third component which is found in at least one phase formed, when said liquids have been formed and separated, is taken from said phase into a remaining phase by intimately intermingling the phases as soon as possible after their formation, following which the phases are again formed and separated each from the other.

Also, according to the present invention, there is provided a method for producing an alkylate from ethylene, a higher olefin and an isoparaffin in the presence of HF catalyst which comprises the steps of alkylation of said hydrocarbons, fractionation of an alkylation effluent thus obtained to obtain a fraction containing ethane, propane, ethyl fluoride and HF, chilling said fraction to a temperature at least as low as about 70°F to cause separation therefrom of a phase consisting essentially of a high purity HF, heating the remainder of said fraction under conditions to remove therefrom ethane, thus obtaining a residual portion containing propane and ethyl fluoride, and contacting said portion with said higher purity HF to remove therefrom the ethyl fluoride and yielding remaining propane.

Also, according to the present invention, there is provided a method as just described wherein the alkylation effluent is fractionated to produce in addition to said fraction at least one isoparaffin recycle containing alkyl fluoride which is recycled to the alkylation and a raw alkylate, the raw alkylate is contacted with said high purity HF to remove therefrom alkyl fluoride, thus recovering an alkyl fluoride free alkylate and HF containing alkyl fluoride, which can be reused in the method.

Still according to the invention, the HF containing alkyl fluoride is recycled to the alkylation.

Further still, according to the invention, the HF containing alkyl fluoride resulting from the treatment of said residual portion containing propane and ethyl fluoride with high purity HF is also recycled to the alkylation.

Further still, according to the invention, which deals with recovery of fluoride and its conversion to additional alkylate, there is recovered from the fractionation an isoparaffin recycle containing ethyl fluoride which is at least in part cooled to liquefy the same, the liquid thus obtained is passed to an HF rerun as reflux therefor, a part of said recycle is passed to said HF rerun as vapor and therein contacted with said liquid and there is obtained from said HF rerun an overhead which is relatively pure HF and which is contacted with an alkylate from said alkylation in an alkylation effluent settling zone.

Thus, according to the present invention, the phase lean in the third component can be used directly to remove from the phase rich in said component the said component. One skilled in the art in possession of this disclosure and having studied same will understand that the invention in one of its basic concepts is widely applicable, it being understood by him that one of my discoveries is in the finding that though the liquids are condensed in the presence of each other and the third component, there is not an equilibrium distribution of the third component between the phases which form upon said condensation.

Further, according to the invention, there is provided a process for the alkylation of an isoparaffin with an olefin in the presence of an HF catalyst which comprises performing an alkylation as described, obtaining a hydrocarbon phase containing organic fluoride, fractionating said phase to obtain therefrom alkylate, isoparaffin and a stream containing hydrocarbon, organic fluoride and HF, condensing said stream to obtain a hydrocarbon phase and an HF phase, returning to the fractionation as reflux therefor a portion of said hydrocarbon phase, combining said HF phase and at least a portion of the remainder of said hydrocarbon phase, thus to extract from said hydrocarbon phase into said HF phase the organic fluoride in said hydrocarbon phase, recovering the organic fluoride, treating the hydrocarbon phase from which organic fluoride has been removed to recover therefrom HF, passing the recovered HF to the first mentioned acid phase to thus improve its purity, and yielding the thus treated hydrocarbon phase from the operation.

Still according to the invention, at least a portion of the combined HF phase and portion of hydrocarbon phase is heated to increase removal of organic fluorides from the hydrocarbon phase, and to produce an HF-organic fluoride phase of reduced hydrocarbon content which then is heated and combined with the combined HF phase and hydrocarbon phase.

Still further, according to the invention, there are provided for the operation of the process, zones and equipment, described herein, making use of eductors, time cycling tanks or loops, said time tanks or loops being combined with settling sections, as also described herein.

While the invention can readily be applied to other cases, it will now be described in more detail in connection with the alkylation of hydrocarbons, e.g., of an isoparaffin with an olefin. More specifically, the invention is applied to a fractionation overhead which is cooled and condensed and which contains hydrocarbon, HF acid catalyst and alkyl fluoride, e.g., ethyl fluoride, propyl fluoride, butyl fluoride, etc.

Figure 1:
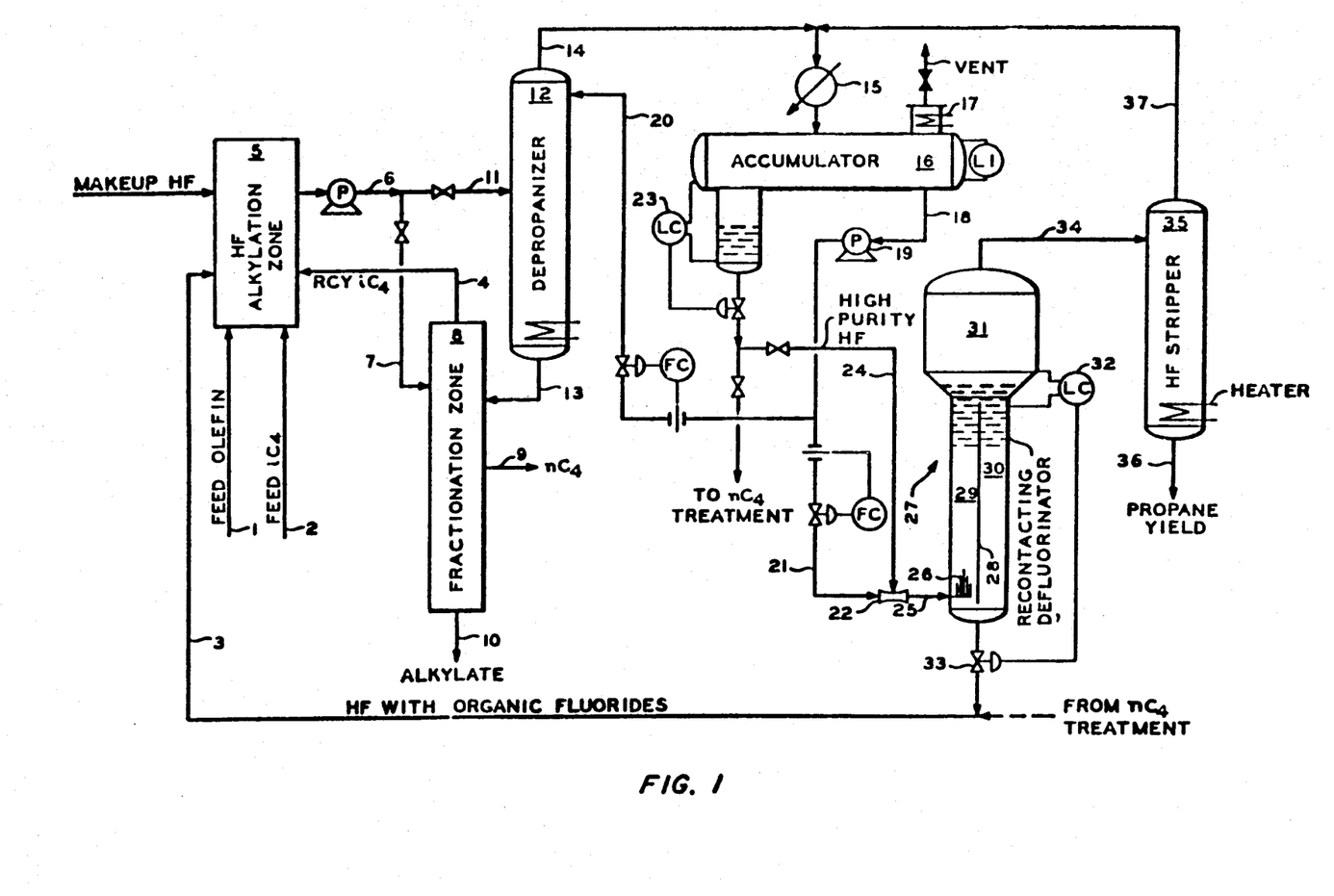
FIG. 1 is a diagrammatic view of a flow plan according to the invention in which the light hydrocarbon or propane to be yielded is contacted with high purity HF before the hydrocarbon is passed to the HF stripper.

Referring now to FIG. 1, olefin 1, isobutane 2, HF containing organic fluorides 3, and recycle isobutane 4 are charged to a conventional HF alkylation operation zone 5. Zone 5 includes the usual reactor, phase separator or settler with HF recycle and an HF rerun unit. Separated hydrocarbon effluent 6 from the alkylation zone, the hydrocarbon including propane, unreacted isobutane, normal butane, alkylate (pentanes and heavier), and organic fluorides is split into two portions. One portion 7 is charged to fractionation zone 8. In fractionation zone 8, isobutane 4 is recovered for recycle to alkylation zone 5, normal butane is recovered at 9, and product alkylate is recovered at 10. The other portion of hydrocarbon effluent, in an amount to prevent propane buildup by recycle in isobutane, is passed by 11 into depropanizer 12. Isobutane and heavier is removed from depropanizer 12 by 13 and passed to fractionation zone 8. The overhead from depropanizer 12 is passed by 14 to condenser 15 and into overhead accumulator 16. Uncondensed vapors as when ethane is present, as when ethylene is used, are removed by refrigerated zone 17. The propane liquid, which also contains organic fluorides and dissolved HF, is removed from accumulator 16 by conduit 18 and pump 19. A portion of this propane is passed on flow control by 20 as reflux for the depropanizer. A portion which is that amount of propane which must be processed to yield propane product, propane charged with the feed to alkylation plus any propane produced during alkylation, is passed via 21 to power eductor 22. The relatively pure HF, accumulated in accumulator 16, on level control 23 is educted into 22 by conduit 24. The effluent from eductor 22 is passed by 25 and nozzle assembly 26 into recontacting unit 27. Herein the organic fluorides contained in the product propane are removed and recovered in the HF. Unit 27 has a divider or baffle 28 forming riser zone 29 wherein the emulsion of propane and HF liquid exiting the nozzles 26 is further contacted to allow the HF to extract the organic fluorides from the product propane. Owing to the force of the liquid ejected by the nozzles and the less dense character thereof, the mass passes upwardly through zone 29 into settler or separation zone 31. The heavier liquid HF containing organic fluorides removed from the liquid product propane flows by downcomer zone 30 around the lower end of baffle 28 and is recycled. A level control 32 in settler 31 actuates control valve 33 in the conduit 3 which returns the HF plus the organic fluorides extracted from product propane back to the HF alkylation zone 5.

Product propane substantially free of organic fluorides is passed by 34 to HF stripper 35 wherein HF is removed from the propane which is removed as liquid product by 36. Overhead from HF stripper 35 containing HF and propane vapor is passed by conduit 37 and condenser 15 to overhead accumulator 16.

It is within the scope of the invention to effect, although not shown, a similar treatment of normal butane stream 9.

Figure 2:
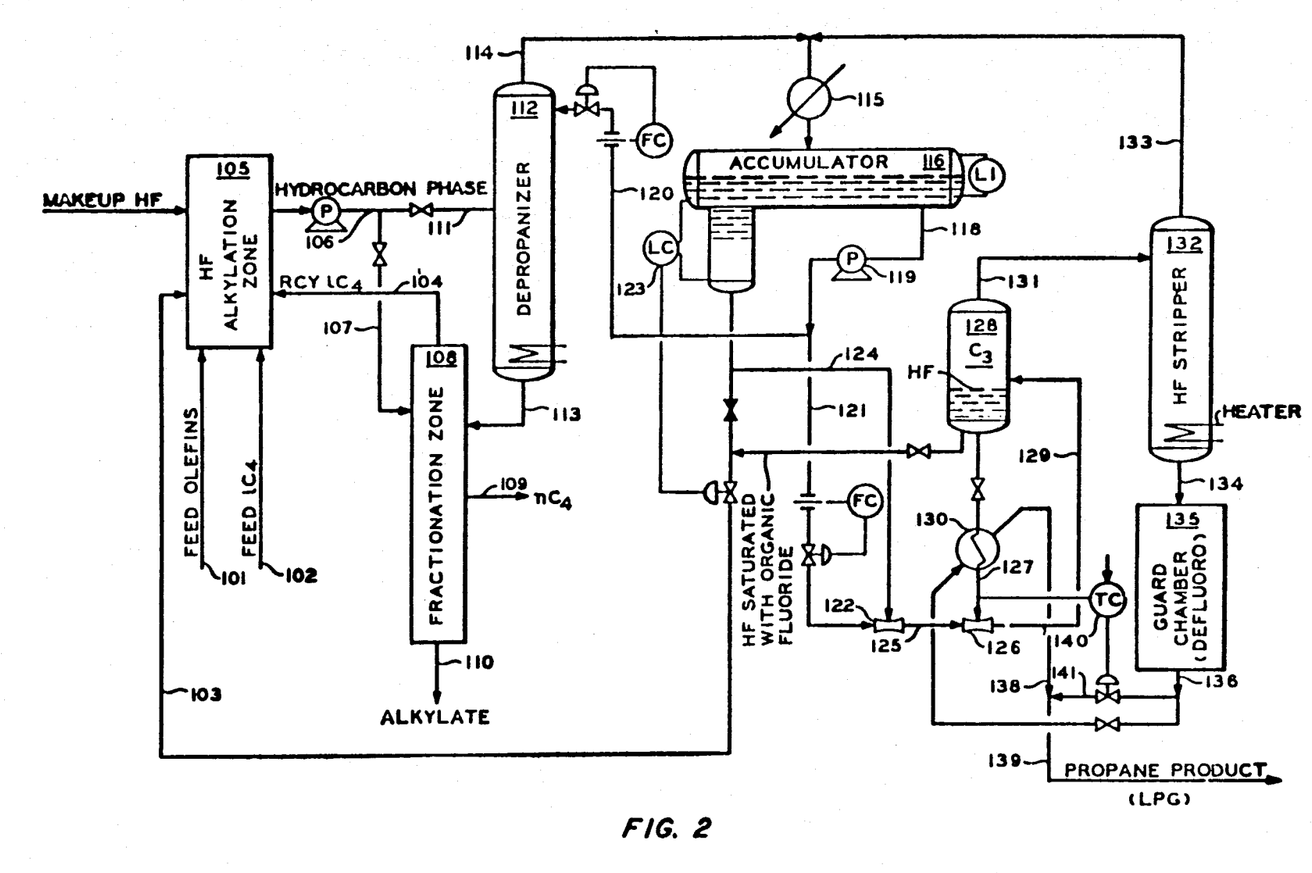
FIG. 2 shows an embodiment wherein the combined acid and hydrocarbon phases from the depropanizer overhead is heated to form a heated HF phase from which hydrocarbon has been released and the heated HF is combined with the original combined phases.

Referring now to FIG. 2, olefin feed 101, isobutane feed 102, HF containing organic fluorides 103, and recycle isobutane 104 are charged to a conventional HF alkylation zone 105. Separated hydrocarbon effluent 106 from the alkylation zone, hydrocarbon including propane, unreacted isobutane, normal butane, alkylate (pentenes and heavier), and organic fluorides, is split into two portions. One portion 107 is charged to fractionation zone 108. In fractionation zone 108 isobutane 104, above-mentioned, is recovered for recycle to alkylation zone 105, normal butane is removed at 109, and product alkylate is recovered at 110. Another portion of the hydrocarbon effluent, in an amount to prevent propane buildup by recycle in isobutane, is passed by 111 into depropanizer 112. Isobutane and heavier is removed from depropanizer 112 by 113 and passed to fractionation zone 108. The overhead from depropanizer 112 is passed by 114 to condenser 115 and into overhead accumulator 116. The propane liquid, which also contains organic fluorides and dissolved HF, is removed from accumulator 116 via conduit 118 and pump 119, and is split. A portion of this propane is passed on flow control by 120 as reflux for the depropanizer. Another portion is that amount of propane which must be processed to yield propane product, propane charged with the feed to alkylation plus any propane produced during alkylation. This other portion of propane is passed by 121 to power eductor 122. Educted into 122 is the relatively pure HF, accumulated in accumulator 116, via conduit 124. The emulsion of HF and propane is passed by 125 to power eductor 126 into which is educted heated HF 127 from propane settler 128, described later.

The emulsion of HF and propane from eductor 126 is passed by time zone or pipe riser 129 into propane settler 128. In settler 128 the HF liquid forms a lower phase which is indirectly heated in exchanger 130 and is that heated HF liquid educted into eductor 126, above identified. The heated HF aids to dissolve from the propane the organic fluoride therein. Liquid propane, substantially free of organic fluorides, is passed by 131 to HF stripper 132. HF and propane vapor are removed by 133 and are passed to condenser 115 and into accumulator 116. Hot liquid propane product is removed by 134 and passed to guard chamber 135, usually an alumina bed, to remove any remaining organic fluorides and HF, e.g., by conduit 136 and through indirect heat exchanger 130 as the heat to produce hot HF liquid 127, above mentioned. The now cooler liquid propane product is removed by 138 and 139 as product propane. Temperature controller 140 on the heated HF 127 actuates bypass 141 on the heated liquid propane to regulate the heat added to the HF and to maintain a preselected temperature of HF liquid in line 127. Level or interface controller 123 on the HF acid leg of accumulator 116 actuates control of flow of HF plus organic fluorides returned via 103 to alkylation zone 105.

Figure 3:
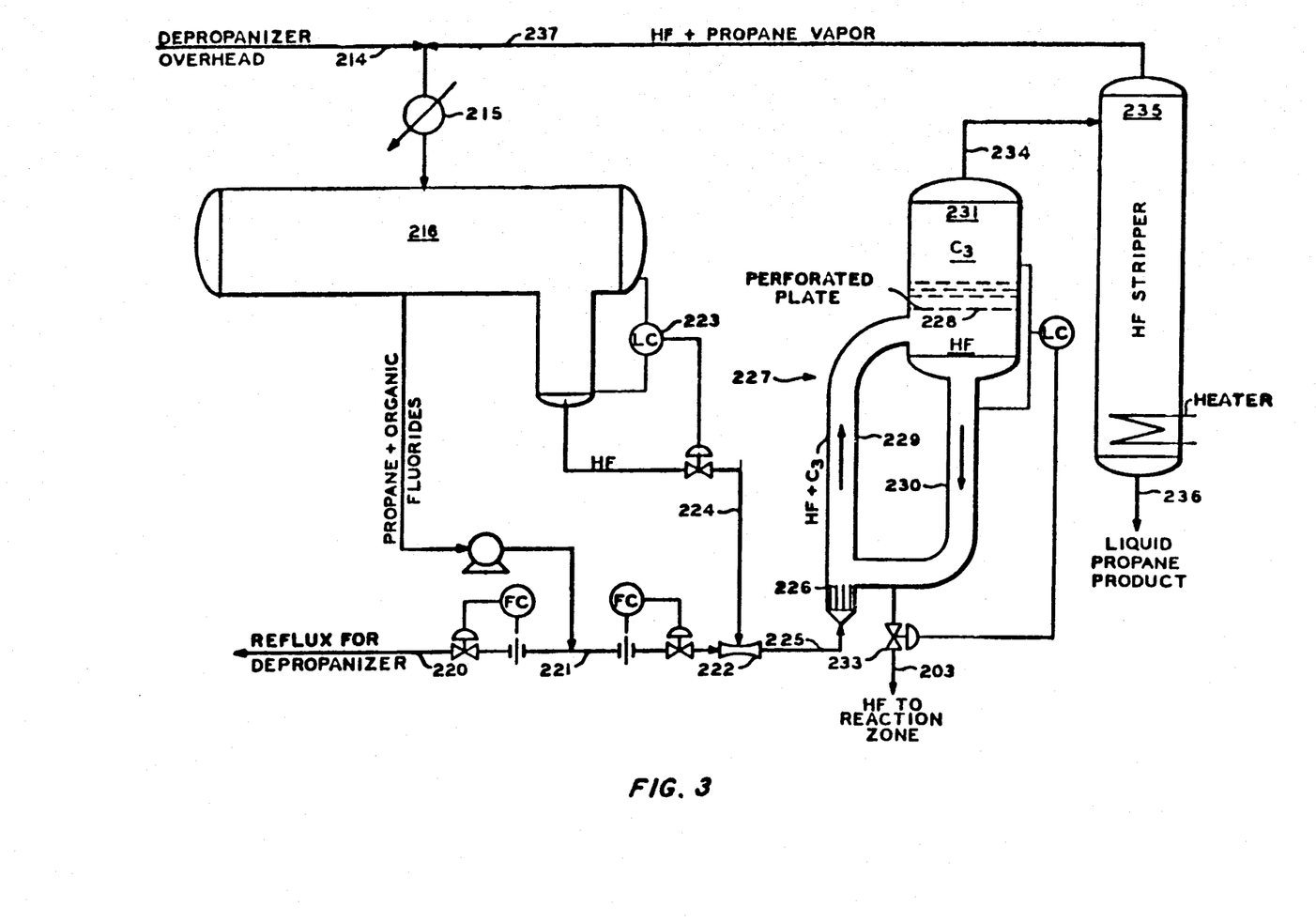
FIG. 3 shows the use of a loop arrangement for cycling the acid and propane to remove the alkyl fluoride therefrom.

Referring now to FIG. 3, there is shown another embodiment of the treatment of the propane stream to be yielded as product. This figure shows the system only from the depropanizer accumulator and downstream thereof.

The propane vapor, containing organic fluorides and HF, is passed by 214, condenser 215 to depropanizer overhead accumulator 216. The liquid hydrocarbon phase is pumped by 221, powering eductor 222 which educts, on level control 223, the liquid HF from accumulator 216 into eductor 222 via 224. The emulsion is passed via nozzles 226 into recontacting zone 227. The emulsion rises in leg or upcomer 229 and forms separate phases in settler 231 having a perforate stilling plate 228 therein. The separated liquid HF, now enriched in organic fluorides removed from the propane strea, flows down leg 230 and is recycled by 229.

A stream of organic fluoride-containing liquid HF on level control actuating valve 233 is passed by conduit 203 to the HF reaction zone (not shown). Propane liquid, substantially free of organic fluorides but saturated with HF, is passed via 234 to HF stripper 235. Liquid propane product, substantially free of HF and organic fluorides, is recovered overhead and passed via 237 and condenser 215 to accumulator 216.

| TYPICAL OPERATION FIGURE 1 | |
|---|---|
| I. Conditions: | |
| HF Reaction Zone (5) Reactor: | |
| Temperature, °F | 90 |
| Pressure, psig | To maintain liquid phase |
| Depropanizer (12): | |
| Pressure, psig | 285 |
| Top Temp., °F | 129 |
| Bottom Temp., °F | 425 |
| DC$_3$ Accumulator (16): | |
| Pressure, psig | 275 |
| Temp., °F (110°F max.) | 100 |
| Recontacting Defluorinator (27): | |
| Pressure, psig | 320 |
| Temp., °F | 100 |
| HF/HC volume ratio | 4:1 |
| HF Stripper 35: | |
| Pressure, psig | 315 |
| Top Temp., °F | 130 |
| Bottom Temp., °F | 145 |
| II. Dimensions of Unit (27): | |
| Diameter, inches | |
| Upper zone | 24 |
| Lower zone | 7 |
| Height, feet | |
| Upper zone, including funnel | 10 |
| Lower zone, to bottom of baffle | 15 |
| Nozzles (26) | |
| Number used | 7 |
| Total flow area, in.$^2$ | 0.344 |
| ΔP on nozzles, psi | 20 |
| III. Flow Rates: | |
| HF Reactor: | |
| Oelfin feed (1), B/D | 2800 |
| Propylene, vol. % | 18.4 |
| Propane, vol. % | 12.6 |
| Butylenes, vol. % | 20.9 |
| Isobutane, vol. % | 28.4 |
| Normal butane, vol. % | 19.7 |
| Isobutane (Fresh & recycle) (2,4) B/D | 17350 |
| Propane, vol. % | 3.4 |
| Isobutane, vol. % | 77.4 |
| Normal butane, vol. % | 19.2 |
| HF/HC Vol. ratio | 4:1 |
| iC$_4$/olefins vol. ratio | 13:1 |
| Depropanizer (12) | |
| Feed, B/D | 20210 |
| Defluorinator (27): | |
| Feed, (21), B/D | 700 |
| Propane, vol. % | 99.0 |
| Isobutane, vol. % | 1.0 |
| Organic fluorides, ppm by wt. | 400 |
| HF Feed (24), B/D | 175 |
| HF, wt. % | 98 |
| Organic fluorides, ppm by wt. | 50 |
| HF/HC vol. ratio within Unit (27) | 4:1 |
| Hydrocarbon (34) from (27), B/D | 700 |
| Propane, vol. % | 99 |
| Isobutane, vol. % | 1 |
| Organic fluorides, ppm by wt. | 75 |
| HF Recycle (3), B/D | 175 |
| HF, Wt. % | 98 |
| Organic fluorides, ppm by wt. | 712 |

When the HF is heated as in the vessel 128 of FIG. 2 and optionally in the loop 229–230 of FIG. 3 to a temperature of about 125°F, about 10 percent additional organic fluoride is removed from the propane product before it is passed to the HF stripper.

The economy of the invention is evident when it is considered that additional alkylate produced in zone 5 from the recovered alkyl fluorides amounts to about 2,600 gallons per year based upon the foregoing example. This recovery is valued at $375. Further, there is also a savings of about $4,000 per year in HF acid which is recovered from the otherwise normally lost alkyl or organic fluorides and in the alumina used to treat out the alkyl fluorides from the propane product 36. Please note the guard chamber 135 in FIG. 2. The recovery of HF acid by way of recovery of the normally lost alkyl or organic fluorides is an ecological improvement since it reduces the aluminum fluoride in the alumina which ultimately is disposed of.

The HF alkylation can be effected in a temperature range of about 40°F to about 150°F and at a pressure to maintain liquid phase. Hydrocarbon to HF acid catalyst volume ratios can be from about 1:15 to about 2:1. Isoparaffin to olefin mol ratios can be from about 2:1 up to 25:1 or more.

In zones 29, 128 and 229 the temperature can be from about 40°F to about 150°F, at pressures to maintain liquid phase. The hydrocarbon to HF catalyst volume ratios can be from about 1:15 to about 2:1.

The fractionation zones and HF stripper are conventional and ranges of operating conditions are known to those skilled in HF alkylation-fractionation art.

Figure 4:
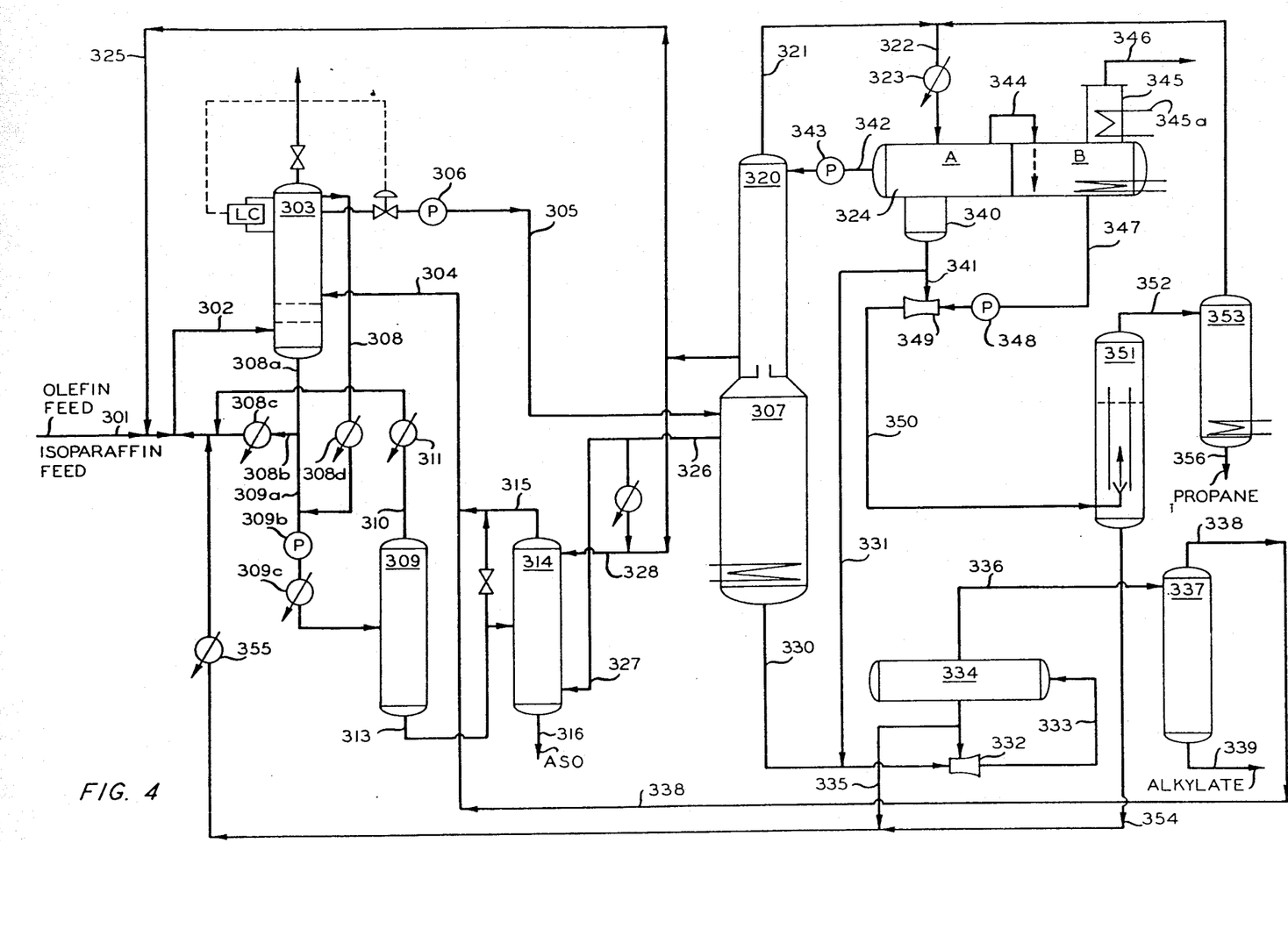
FIG. 4 illustrates an operation in which ethylene, isobutylene and isoparaffin, e.g., isobutane, are alkylated and a propane overhead containing ethyl fluoride is condensed to form a high purity HF phase and propane containing ethyl fluoride and wherein the ethyl fluoride is substantially removed from the propane phase by a recontacting of the high purity HF phase and the propane phase as in an eductor.

Referring now to FIG. 4 of the drawing, ethylene, isobutylene and isoparaffin are fed by 301 into riser-reactor 302 and then to settler 303. High purity HF is also fed to settler 303 by 304. In riser-reactor 302, alkylation with formation of ethyl fluoride occurs. In the upper portion of vessel 303, alkylate forms a supernatant phase removed at 305 and passed by pump 306 to deisobutanizer fractionator 307. Bottoms from settler 303 are circulated by 308a and 308b through cooler 308c to reactor 302. A hydrocarbon liquid level is maintained in settler 303, as shown, and a relief valve is located in the vapor zone of settler 303 to rid the system of any ethane buildup as needed.

A portion of the system liquid catalyst is passed via 308a and 309a along with an HF, ethyl fluoride and unreacted ethylene stream 308, which vapor stream is condensed in 308d, and the admixture is passed via pump 309b and heater 309c into degassing column 309.

A vapor phase containing ethyl fluoride and light hydrocarbon is taken overhead by 310 through cooler 311 and to reactor 302. Bottoms 313 from degasser 309 are passed to HF rerun 314, overhead 315 from which it is passed by 304 as a high purity HF entering settler 303. The feeding of high purity HF into settler wherein it contacts the alkylate effluent from riser-reactor 302 and causes reduction of alkyl fluoride in said effluent. Acid soluble oil is removed from 314 by 316.

Deisobutanizer fractionator 307 is combined with depropanizer 320. In tower 307 the raw alkylate is fractionated yielding an HF-propane containing overhead 321 which is passed by 322, refrigerator cooler 323 to section A of accumulator 324, the operation of which forms an important feature of the present invention. Also yielded from tower 307 is liquid isoparaffinethylene fluoride stream 325 returned by 301 to reactor 302. Stream 325 is high in ethyl fluoride. Stream 326, which is vaporous isobutane lean in ethyl fluoride, is passed in part by 327 as a vapor as stripping vapor to HF rerun 314, is in part cooled to liquefy the same, a portion being passed by 328 as liquid reflux to the top of HF rerun 314 and any remainder being passed by 325 to 301 and to reactor 302. Stream 327 and stream 328 coact in HF rerun 314 to yield additional high purity HF which passes by 315 and 304 to reactor 302.

It is a feature of this invention that ethyl fluoride obtained from degasser 309 which is not completely reacted in reactor 302 will encounter the relatively high purity HF entering settler 303 by 304.

Bottoms 330 comprising alkylate from tower 307 is passed together with high purity HF from 331 into eductor 332 which admixes the alkylate and HF which then passes by 333 into contactor 334. In contactor 334, the alkylate is purified of heavier alkyl fluorides resulting in bottoms stream 335 containing HF and heavier alkyl fluorides including hexyl fluorides which are passed ultimately together with another HF and alkyl fluoride containing stream to reactor 302. Alkylate containing some HF is taken overhead from contactor 334 by 336 passed to HF stripper 337, HF overhead 338 from which is passed by 304 to settler 303. Stripped alkylate is removed from stripper 337 at 339. This alkylate is normally then debutanized.

Returning now to the operation of accumulator 324, according to the invention, the temperature to which stream 322 is cooled in cooler 323 is such that there separates and collects in keg 340 a high purity HF which in part is passed by 331 as with high purity HF which is mixed in eductor 332 with tower 307 alkylate bottoms. The temperature in Section A of the accumulator 324 will be usually at about 70°F or lower. This, according to the invention, causes a significant lowering of the solubility of HF in the hydrocarbon in Section A and results in the generation of the high purity HF in the keg 340. Resulting hydrocarbon is passed by 342 and pump 343 as reflux to the top of tower 307. Hydrocarbon overflows by crossover 344 into Section B of accumulator 324. In section B, there is maintained a relatively low liquid level. A temperature of approximately 125°F is maintained with aid of the heater to gently heat the hydrocarbon liquid which is lean in HF and which contains ethyl fluoride and propane. Ethane also contained in the liquid disengages and is passed upwardly through dephlegmator 345 and chiller 345a which yields an overhead ethane 346 containing a very minimal amount of HF. Section B bottoms 347 containing propane and ethyl fluoride are pumped by 348 into eductor 349 into which high purity HF 341 is passed for admixture in the eductor with propane and ethyl fluoride stream. The mixed stream is passed by 350 into ethyl fluoride extractor 351, wherefrom overhead 352 containing propane and some HF is passed to HF stripper 353. Bottoms from extractor 351 consisting of HF and ethyl fluoride are passed by 354 together with HF and hexyl fluorides in 335 through cooler 355 to reactor 302. Propane is yielded from the system as bottoms 356 from HF stripper 353.

Generally, the conditions of operation in each of the reaction or treating zones of the invention can be determined by mere routing testing by one skilled in the art who knows from the specific example given herein and from his general knowledge in the art how to go about putting the invention into practice. Generally, the conditions for the alkylation, depending upon the result to be obtained and whether boron trifluoride is employed are set forth in detail in copending application Ser. No. 138,999, filed Apr. 30, 1971.

Ordinarily, when the HF catalyst contains zero to about 4 weight percent $BF_3$, based on the HF content of the catalyst, the mol ratio of isoparaffin to total olefin will be in the approximate range of from about 1.5 to 1 to about 25 to 1 and the weight percent of higher olefin in the total olefin will be above about 5. Also, generally, when the isoparaffin to total olefin mol ratio is at least about 4 to 1, the $BF_3$ will be present in an amount in the approximate range of from about zero to about 0.3 weight percent based on the HF content of the catalyst employed. Further, generally, when the isoparaffin to total olefin mol ratio is in the approximate range of from about 1.5/1 to about 4/1, the $BF_3$ will be present in an amount of about 0.3 up to about 4 percent by weight of the catalyst.

The temperature in the alkylation will be in the approximate range of about 75° to about 150°F and pressure sufficient to maintain a substantial part of the hydrocarbon in liquid phase will be employed.

As the higher olefin now preferred is at least one of propylene and a butylene. The butylene is now preferred to be isobutylene. However, propylene can be employed with good results.

Although the accumulator 324 has been described to be a unitary vessel having two sections therein, it will be obvious to one skilled in the art that alternate means can be employed. Thus, for example, two separate vessels can be employed in lieu of Sections A and B or accumulator 324. Further, while a keg 340 has been illustrated, alternative means can be employed for collecting the acid dropping from the chilled overhead 321.

Further, while as illustrated in the drawing, the propane containing alkyl fluoride and high purity HF are passed to extractor 351. It is within the scope of the invention to return at least a portion of the propane and alkyl fluoride together with the high purity HF directly to the alkylation zone; however, there is no need to remove ethyl fluoride from the liquid propane used to reflux tower 320. The entire alkyl fluoride can be returned to the alkylation zone.

As has been noted, the temperature in Section A of accumulator 324 will be below about 70°F. Generally, this temperature can be in the range of from about 70°F down to about 40°F.

In an HF alkylation of isobutane with a mixture of propylene and butylenes, upon fractionation to remove the alkylate and condensing overhead vapor, according to the invention, the organic fluoride in the ordinarily obtained hydrocarbon phase in the accumulator operated without the heater in Section B, as later described, by operation of the present invention was reduced from 110 parts per million by weight to 40 parts per million by weight.

In the HF alkylation of isobutane with propylene and butylenes, wherein the baffle between Section A and B, and the heater of the accumulator 324 are not used, wherein extraction zone 351 is used only as a liquid phase separator after remixing of hydrocarbon in 347 and HF in 340 is effected in 349, and wherein, also, degasser 309, stripper 337 and recontact section including 334 are not used, the following calculated example illustrated the invention.

The data given with respect to the reduction of the total alkyl fluoride content of the depropanizer overhead accumulator hydrocarbon liquid phase from about 110 to about 40 parts per million by weight were obtained by taking plant flow samples of the hydrocarbon and of the HF acid phases from an accumulator like 324 of the present drawing and analyzing the hydrocarbon phase for total alkyl fluoride content (reported as fluoride) following which the samples were contacted, that is, contacted according to the invention, and whereupon analysis showed the stated reduction of the total alkyl fluoride content of the hydrocarbon phase. Usually the residual fluoride content of the hydrocarbon so treated will be further treated with conventional alumina, bauxite, solid KOH, or the like, to further decrease any remaining fluorides in the hydrocarbon stream.

| OPERATING CONDITIONS | |
|---|---|
| Riser-Reactor (302): | |
| Temperature, °F | 90 |
| Pressure, psig | 200 |
| | |
| HF Rerun (314): | |
| Temperature, °F | 325 |
| Pressure, psig | 225 |
| | |
| Fractionator: | |
| Section (307): | |
| Pressure, psig | 305 |
| Draw Tray Temp., °F | 210 |
| Bottom Temp., °F | 320 |
| Section (320): | |
| Pressure, psig | 300 |
| Top Temp., °F | 130 |
| | |
| Accumulator (324): | |
| Pressure, psig | 275 |
| Temperature, °F | 100 |
| | |
| Stripper (353): | |
| Pressure, psig | 330 |
| Temperature, °F | 132 |
| | |
| Stripper (337): | |
| Pressure, psig | 250 |
| Temperature, °F | 320 |
| | |
| FLOW RATES | |
| Conduit (301), B/D | 2,752 |
| Propylene, vol. % | 14.1 |
| Propane, vol. % | 14.3 |
| Butylenes, vol. % | 16.6 |

| | |
|---|---|
| Normal butane, vol. % | 15.0 |
| Isobutane, vol. % | 40.0 |
| | |
| Conduit (325), B/D | 13,342 |
| Propane, vol. % | 4.9 |
| Isobutane, vol. % | 74.3 |
| Normal butane, vol. % | 20.8 |
| Alkyl fluorides, ppm by wt., as F | 400 |
| | |
| Catalyst/Hydrocarbon Vol. Ratio in Reactor (302) | 4:1 |
| Acid Strength, wt. % HF | 90 |
| | |
| Effluent in Conduit (305), B/D | 16,067 |
| | |
| Effluent in Conduit (339), B/D | 1,930 |
| Alkyl fluorides, ppm by wt., as F | 40 |
| | |
| High Purity HF (349), B/D | 200 |
| Acid Strength, wt. % HF | 98 |
| | |
| Conduit (347), B/D | 610 |
| Alkyl fluorides, ppm by wt., as F | 110* |
| | |
| Effluent in Conduit (356), B/D | 455 |
| Alkyl fluorides, ppm by wt., as F | 40* |
| HF, mol. % | 0.002 |

*Mainly isopropyl fluoride.

Below is a further typical operation of the invention:

TYPICAL OPERATION

| | |
|---|---|
| Operating Conditions: | |
| Riser-Reactor (302): | |
| Temperature, °F | 90 |
| Pressure, psig | 200 |
| Degasser (309): | |
| Temperature, °F | 180 |
| Pressure, psig | 250 |
| HF Rerun (314): | |
| Temperature, °F | 325 |
| Pressure, psig | 225 |
| Fractionator: | |
| Section (307): | |
| Pressure, psig | 305 |
| Dray Tray Temp., °F | 210 |
| Bottom Temp., °F | 320 |
| Section (320): | |
| Pressure, psig | 300 |
| Top Temp., °F | 130 |
| Accumulator (324): | |
| Section A: | |
| Pressure, psig | 290 |
| Temp., °F | 60 |
| Section B: | |
| Pressure, psig | 288 |
| (Liquid) Temp., °F | 125 |
| Temp. in 345, °F | 125 |
| Extractor (351): | |
| Pressure, psig | 340 |
| Temp., °F | 125 |
| Stripper (353): | |
| Pressure, psig | 330 |
| Temp., °F | 132 |
| Extractor (334): | |
| Pressure, psig | 275 |
| Temp., °F | 300 |
| Stripper (337): | |
| Pressure, psig | 250 |
| Temp., °F | 320 |
| Flow Rates: | |
| Conduit (301), B/D | 2,150 |
| Ethylene, vol. % | 30.7 |
| Propane, Ethane, vol. % | 1.9 |
| Butylenes, vol. % | 12.8 |
| Normal Butane, vol. % | 2.5 |
| Isobutane, vol. % | 52.1 |
| | |
| Conduit (325), B/D | 11,190 |
| Propane, vol. % | 4 |
| Isobutane, vol. % | 88 |
| Normal butane, vol. % | 8 |
| $C_3H_7F$, ppm by wt. | 3,000 |
| | |
| Catalyst to H/C Vol. Ratio in (302): | 4:1 |
| Acid Strength (HF), wt. % | 85 |
| $C_3H_8$, wt. % | 10 |
| Effluent in Conduit (305), B/D | 13,500 |

| TYPICAL OPERATION | -continued | |
| --- | --- | --- |
| Effluent in (308): SCF/Day | | 300,000 |
| $C_2H_5F$, vol. % | 1.0 | |
| Effluent in (356), B/D | | 70 |
| Alkyl fluorides, as F, ppm by wt., mol % | | 0.003 |
| Effluent (339), B/D | | 1,560 |
| Alkyl Fluorides | | |
| HF            NIL | | Trace |
| High Purity HF (349), B/D | | 100 |
| Acid Strength (HF), Wt.% | 98 | |
| High Purity HF (331), B/D | | 100 |
| Acid Strength (HF), Wt.% | 98 | 100 |
| Conduit (347), B/D | | 70 |
| $C_2H_5F$, wt. % | 10.0 | |
| Conduit (330), B/D | | 1,560 |
| Alkyl fluorides, ppm by wt. | 2,500 | |
| Temperature Ranges in (324): | | |
| Section A | 40°F to 80°F | |
| Section B (Heated) | 100°F to 130°F | |
| Pressure Ranges in (324): | | |
| Section A | 250 psig to 320 psig | |
| Section B | 248 psig to 318 psig | |

Savings which are accomplished when the alkyl fluorides are converted to alkylate amount to 15,000 barrels/year, valued at $90,000.

While the invention has been described in particular as related to a specific form of it, it is applicable generally to the separation and recovery of a component as herein described.

In the alkylation art in which the invention has been operatively effected, the invention is applicable to the alkylation of isoparaffins having 4 to 6 or more carbon atoms per molecule with olefins having 2 to 6 and more carbon atoms per molecule, it being essential only that there be difficult to separate component present as herein described. Such component can be ethyl fluoride and/or isopropyl fluoride, or other fluoride resulting from or employed in the alkylation.

While in the foregoing description of the drawing there is described a heater in section B, it will be evident from this desclosure that such a heater can be omitted if, say, ethane is not warmed off. When the heater is not used, the partition and conduit 44 between sections A and B can be eliminated.

| Latent Heats of Vaporization at 100°F | |
| --- | --- |
| | Btu/Pound |
| Propane | 183 |
| Hydrofluoric Acid | 195 |

Consideration has been given to the heat contents of the various ingredients and the third component when these are being cooled. The latent heats of evaporation and whatever specific heats may be involved are different for different ingredients, thus the rate of cooling and the temperature at which the several materials will liquefy or the degree to which the third component will be dissolved in either of the immiscible liquids as these are condensing to form liquids can effect the amount of the third component found in the two phases which are first formed.

The applicability of the invention can be determined by routine testing. Also, one can correlate the above information relating to heat content with respect to findings in phases formed upon condensation to determine the desirability of application of the invention to a particular situation.

Figure 5:
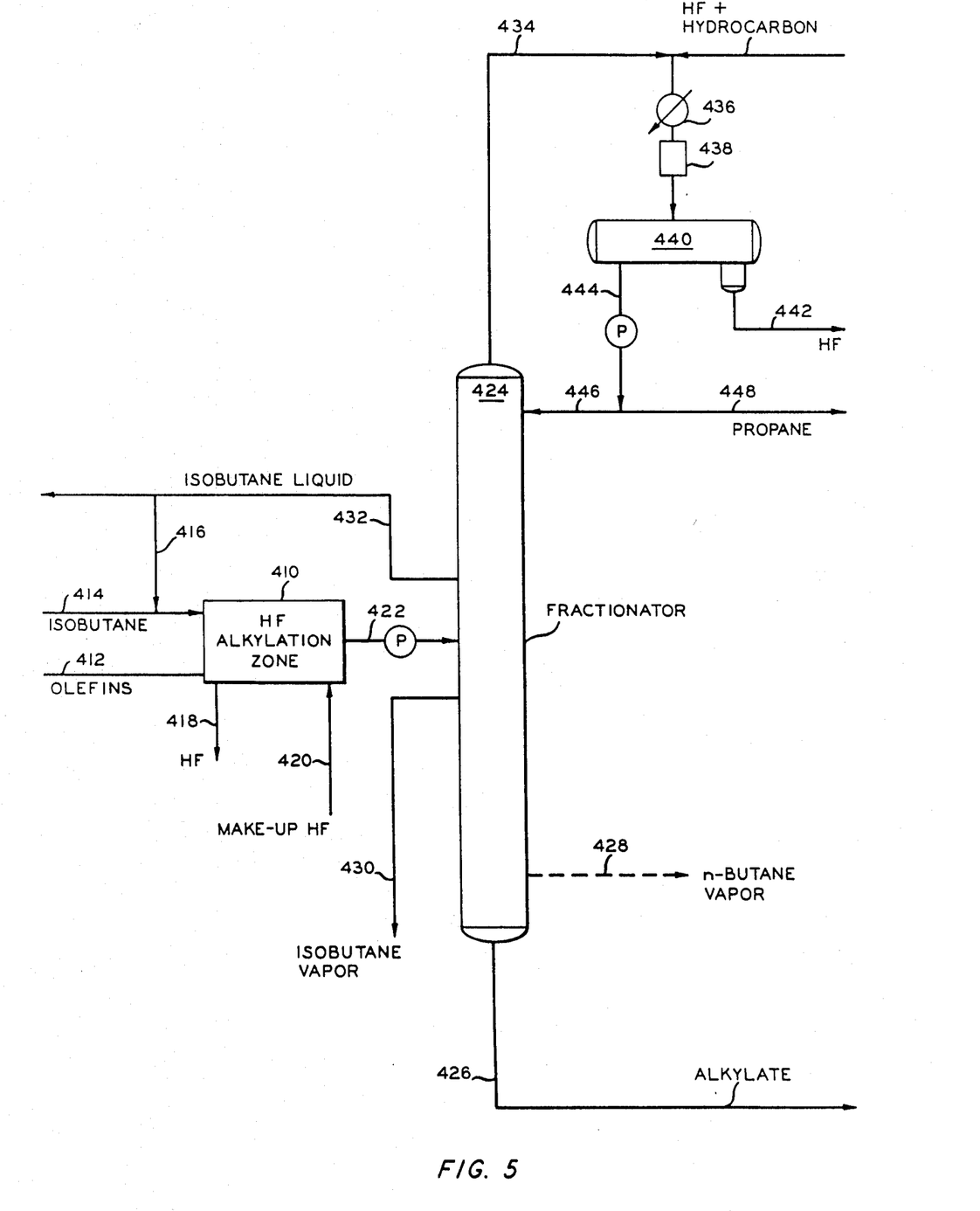
FIG. 5 shows the use of a mixer element located between a condenser and an accumulator acting on a fractionator overhead containing hydrocarbon, alkyl fluoride and HF acid, all in vapor form.

Referring now to FIG. 5 of the drawing, olefins, e.g., propylene, butylene, amylenes (and in some operations ethylene), are charged to HF alkylation zone 410 by 412. Fresh or feed isoparaffin, e.g., isobutane and/or isopentane, is charged to the alkylation zone by 414. Recycle isobutane liquid, subsequently recovered, is charged to this zone by 416. A slip stream of the liquid HF catalyst 418 is sent to HF rerun (not shown) and rerun HF, along with makeup HF liquid catalyst is returned to the alkylation zone by 420. Total hydrocarbon liquid from alkylation zone 410 is pumped by 422 to fractionator 424, shown as a single tower for illustrative purposes. Alkylate product is removed at line 426. Normal butane vapor is removed at 428', isobutane, when this is the isoparaffin, is removed at 430 as vapor for stripping in the HF rerun tower. Isobutane liquid is removed at 432 with a portion being used to reflux the HF rerun tower and as the abovementioned recycle isobutane 416. Vapor, from fractionation, comprising propane and lighter hydrocarbons, HF, and organic fluorides, e.g., ethyl fluoride, is passed through condenser 436 and, according to the invention, into and through mixing zone 438; in this embodiment a conventional static mixer and the admixed liquid phases of now condensed hydrocarbon and HF catalyst are passed to overhead accumulator-settler 440. Separated HF liquid can be returned to the alkylation zone. Hydrocarbon liquid phase, which is mainly propane, is pumped by 444, partly as tower 424 reflux by 446, and the yield quantity is removed by 448 for further processing, e.g., HF stripping and bauxite or alumina treatment.

When the liquid phases from condenser 436 are charged directly to accumulator-settler 440, without the mixing step of the invention, the hydrocarbon phase has 110 parts per million by weight organic fluorides, reported in laboratory test data as fluorides. When the mixing step of my invention is used, the fluoride content of the hydrocarbon phase is reduced to about 40 parts per million, as fluoride, by weight, also according to laboratory test data. The organic fluorides are removed from the produced liquid hydrocarbon phase by contact in the mixing zone with the produced liquid HF phase.

The reason that this recontact of the two produced liquid phases is effective is believed to be as follows:

It has occurred to me that due to the different condensing temperatures of HF acid and the hydrocarbons, and due to the differences in vaporization equilibrium constants, the hydrocarbon condenses first and the HF condenses last. Due to the 0.9+ specific gravity of liquid HF as compared with the about 0.5 specific gravity of the liquid hydrocarbon phase, the acid settles to the bottom of the accumulator-settler without sufficiently mixing or contacting the liquid hydrocarbon and will not have removed (extracted or reacted out) organic fluorides from the liquid hydrocarbon. By mixing, as in my invention of the two condensates as formed, prior to their entry into the accumulator-settler, or, at least prior to permitting phase formation and effecting separation of the formed phases from each other, a major portion of the organic fluorides is removed from the hydrocarbon product.

The following typical operating example is given based upon the knowledge of the art, laboratory data which have been made available, computer program runs to obtain fractionation data, and engineering knowledge.

| TYPICAL OPERATING EXAMPLE | |
| --- | --- |
| (422) Hydrocarbon, B/D | 30,841 |
| Propane and lighter, vol.% | 7.01 |
| Isobutane, vol. % | 66.64 |
| Normal butane, vol. % | 13.56 |
| Isopentane plus (alkylate), vol. % | 12.15 |
| HF, wt. % | 1.0 |
| Organic fluorides, ppm | 400 |
| (424) Tower Overhead, B/D (as liquid) | 13,629 |
| Propane and lighter, vol. % | 96.75 |
| Isobutane and heavier, vol. % | .95 |
| HF, wt. % | 3.7 |
| Organic fluorides, ppm | 110 |
| (448) Propane Yield, B/D | 685 |
| Ethane and lighter, vol. % | 1.31 |
| Propane, vol. % | 96.35 |
| Isobutane and heavier, vol. % | 1.33 |
| HF, wt. % | 2.0 |
| Organic fluorides, ppm | 40 |
| Typical Operating Conditions: | |
| Tower 424: | |
| Top temperature, °F | 129 |
| Bottom temperature, °F | 439 |
| Pressure, psig | 300 |
| Accumulator-Settler 440: | |
| Temperature, °F | 100 |
| Pressure, psig | 290 |
| Mixer 438: | |
| Contact time, seconds | 5 |

One skilled in the art in possession of this disclosure will understand that variation and modification are possible within the unit design in any given instance in which two fluids are to be ultimately separated each from the other after liquid phase formation but only after operating according to the invention to admix the liquids as these are being reformed by condensation or shortly thereafter and before allowing the phase separation to take place. He will also understand that although equilibrium concentrations may be reached after a long period of standing there is no time to accomplish such long-term standing or settling in a dynamic system as in plant operation. Thus, my invention permits operating at full, rapid throughputs because each and every small portion of condensate of one liquid is admixed with each and every portion of condensate of the other condensing liquid, regardless of their respective temperatures of condensation, rates of condensation or specific gravities.

One skilled in the art having studied this disclosure will also understand that the invention is not limited to placing the mixing element between the condenser and the accumulator. It can be placed anywhere in an operation prior to phase formation. If phases have been allowed to form, these phases can be admixed, according to the invention, before the phases are actually physically separated each from the other to obtain two different liquid streams. The invention is primarily and preferably applicable in those situations in which a dynamic system is being operated.

The general conditions of operation for any given process in which this invention is applicable are known to the art and are incorporated herein by reference to said art. The broad concept or crux of my concept of the invention is in the finding that by intimate admixing of liquids which apparently are already admixed there can be effected much more rapidly a separation of phases each of which will have more nearly the equilibrium concentration of the third component as it would be distributed in said liquids had the condensed vaporous stream been allowed to stand for an indefinite time, as explained herein.

Reasonable variation and modification are possible within the scope of the foregoing disclosure, drawings and the appended claims to the invention the essence of which is that as being condensed or after condensation, but before formation of quiescent liquid phases, or prior to or after separation of phases formed by two vaporous components in admixture with each other and with a third component which is soluble in each of the first two components, when condensed there is effected as the said two components are condensed or at least before liquid phases are finally separated each from the other an admixture, substantially as described herein.

I claim:

1. A process for the alkylation of an isoparaffin with an olefin in the presence of HF acid catalyst which comprises alkylating isoparaffin with at least one olefin in the presence of HF acid catalyst, settling from the alkylation effluent a first hydrocarbon phase containing HF acid and organic fluoride, passing a first portion of said first hydrocarbon phase into a first fractionation zone and a second portion of said hydrocarbon phase to a second fractionation zone, separating a light hydrocarbon stream in said first fractionation zone and passing the remainder of said first portion to said second fractionation zone, recovering from said second fractionation zone an alkylate product and recycling isoparaffin, propane, HF, and organic fluoride from said second fractionation zone to said alkylation, condensing said light hydrocarbon stream to obtain a second hydrocarbon phase and an HF acid phase, returning a first portion of said second hydrocarbon phase as reflux to said first fractionation zone; mixing a second portion of said second hydrocarbon phase with at least a portion of said HF acid phase thus to extract from said second portion of said second hydrocarbon phase into said portion of said HF acid phase the organic fluoride which is in said second portion of said second hydrocarbon phase, settling the mixture of said second portion and said HF acid phase and recovering from said mixture an HF acid phase enriched by said organic fluoride and a third hydrocarbon phase from which organic fluoride has been removed, treating said third hydrocarbon phase from which organic fluoride has been removed to strip HF acid from the third hydrocarbon phase and recovering the stripped hydrocarbon from the process.

2. A process according to claim 1 wherein at least a portion of said admixed second portion of said second hydrocarbon phase and said portion of said HF acid phase is heated to produce a heated HF-organic fluoride phase of reduced hydrocarbon content and heated hydrocarbon phase from which organic fluoride has been removed, and wherein at least a portion of said HF-organic fluoride phase in heated condition is combined with another portion of said admixed second portion of said second hydrocarbon phase and said portion of said HF acid, and wherein said heated hydrocarbon phase is treated to strip HF therefrom and the thus stripped hydrocarbon is yielded from the process.

3. A process according to claim 1 wherein said HF acid phase and said second portion of said second hydrocarbon phase are combined in an eductor zone motivated by said second portion of said second hydrocarbon phase.

4. A process according to claim 3 wherein the eductor effluent is used to motivate a further eductor zone into which a heated HF-organic fluoride phase is educted, the resulting mixture of said heated HF-organic fluoride phase and said eductor effluent is separated into said third hydrocarbon phase from which organic fluoride has been removed and an HF-organic fluoride phase.

5. A process according to claim 3 wherein said isoparaffin is at least one of isobutane and isopentane, said olefin is ethylene and a higher olefin and the organic fluoride includes ethyl fluoride.

6. A process according to claim 1 wherein said alkylate product is intimately mixed with a portion of said HF acid phase to extract from said alkylate product into said portion of said HF acid phase the organic fluoride which is in said alkylate phase, thus recovering a substantially organic fluoride-free alkylate and HF acid containing organic fluoride.

7. A method for producing an alkylate from ethylene, a higher olefin and an isoparaffin in the presence of HF acid catalyst which comprises the steps of:
 a. alkylating said ethylene and said higher olefin with said isoparaffin,
 b. separating the alkylation effluent into a hydrocarbon phase and an acid phase,
 c. fractionating said hydrocarbon phase to withdraw an alkylate product and to separate a light fraction containing ethane, propane, ethyl fluoride, and HF,
 d. chilling said light fraction to substantially condense said fraction into liquids,
 e. intimately mixing the condensed liquids of step (d) and separating the mixed liquids into an HF liquid phase and a hydrocarbon liquid phase,
 f. removing ethane from said hydrocarbon liquid phase, and
 g. recovering said hydrocarbon liquid phase from step (f) comprising propane of reduced ethyl fluoride content.

8. A method according to claim 7 wherein said fractionating step (c) includes at least one isoparaffin fraction containing alkyl fluoride and said isoparaffin fraction is recycled to said alkylating step.

9. A method according to claim 7 wherein said HF liquid phase which contains ethyl fluoride is recycled to said alkylating step.

10. A method according to claim 7 wherein ethane in step (f) is removed from said hydrocarbon liquid phase by heating.

11. A method according to claim 7 wherein the isoparaffin is at least one of isobutane, isopentane, and isohexane, and the higher olefin is at least one of propylene, a butylene, an amylene, and a hexylene.

* * * * *